United States Patent [19]
Rafeld

[11] Patent Number: 5,316,349
[45] Date of Patent: May 31, 1994

[54] TUBE CONNECTING ELEMENT OF PLASTIC FOR SANITARY AND HEATING PURPOSES

[75] Inventor: Karl Rafeld, Biessenhofen-Ebenhofen, Fed. Rep. of Germany

[73] Assignee: Karl Rafeld KG Spritzgusswerk, Elektronik und Formenbau, Biessenhofen-Ebenhofen, Fed. Rep. of Germany

[21] Appl. No.: 919,249

[22] Filed: Jul. 27, 1992

[30] Foreign Application Priority Data

Feb. 27, 1992 [DE] Fed. Rep. of Germany ... 9202575[U]

[51] Int. Cl.$^5$ ............................................. F16L 41/00
[52] U.S. Cl. ................................. 285/156; 285/179; 285/178
[58] Field of Search ................. 285/156, 179, 419, 178

[56] References Cited

U.S. PATENT DOCUMENTS

| | | | |
|---|---|---|---|
| 2,413,878 | 1/1947 | Maky | 285/179 X |
| 2,791,450 | 5/1957 | Hombach | 285/156 |
| 2,845,031 | 8/1958 | Kozlowski et al. | 285/178 X |
| 3,598,157 | 8/1971 | Farr et al. | 285/178 X |
| 3,850,459 | 11/1974 | Blumerkranz et al. | 285/156 |
| 4,307,901 | 12/1981 | Orberg et al. | 285/179 X |
| 4,595,319 | 6/1986 | Cook | 285/179 X |
| 5,188,396 | 2/1993 | Calvin | 285/179 X |

FOREIGN PATENT DOCUMENTS

| | | | |
|---|---|---|---|
| 524744 | 4/1956 | Belgium | 285/179 |
| 298398 | 6/1917 | Fed. Rep. of Germany | 285/179 |
| 9448 | 12/1955 | Fed. Rep. of Germany | 205/179 |
| 1012498 | 7/1957 | Fed. Rep. of Germany | 285/179 |
| 2266845 | 10/1975 | France | 285/156 |
| 347050 | 7/1960 | Switzerland | 285/156 |
| 13962 | 5/1894 | United Kingdom | 285/179 |

Primary Examiner—Randolph A. Reese
Assistant Examiner—Heather Chum
Attorney, Agent, or Firm—Kalish & Gilster

[57] ABSTRACT

A tube connecting element of plastic for sanitary and heating purposes, has two connecting sleeve elements each having a bore, which bores are in alignment with respect to one another so as to form a common flow through bore, and into which plastic tubes may be welded. The tube connecting element has a sleeve body between the two connecting sleeve elements and forms therewith a united entirety. The sleeve body is provided with a bore extending perpendicularly to the common bore of the connecting sleeve elements and serves for the reception of a third plastic tube. The common flow through bore connecting the two bores of the connecting sleeve elements is offset with respect to the center line of the two aligned bores in the direction of the outer wall of the T-configurated tube connecting element located oppositely to the perpendicularly extending bore. The connecting bore is provided with a diameter B which is smaller than the diameters A1, A2 of the aligned bores of the connecting sleeve element, and is separated from the perpendicularly extending bore by its bottom wall which has a thickness C corresponding generally to the wall thickness D1 of the connecting sleeve elements and is joined with the perpendicularly extending bore by another bore, the cross section of which is in general smaller by the wall thickness D1 of the connecting sleeve element than the cross section of the perpendicularly extending bore.

14 Claims, 2 Drawing Sheets

FIG. 5
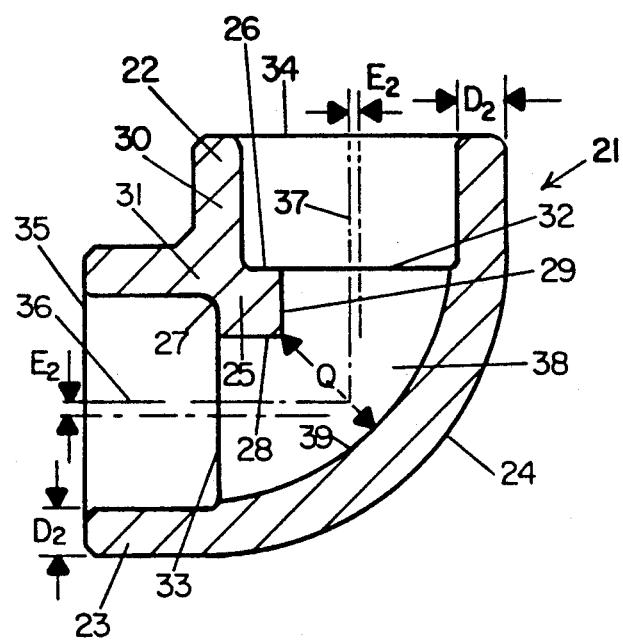
FIG. 7
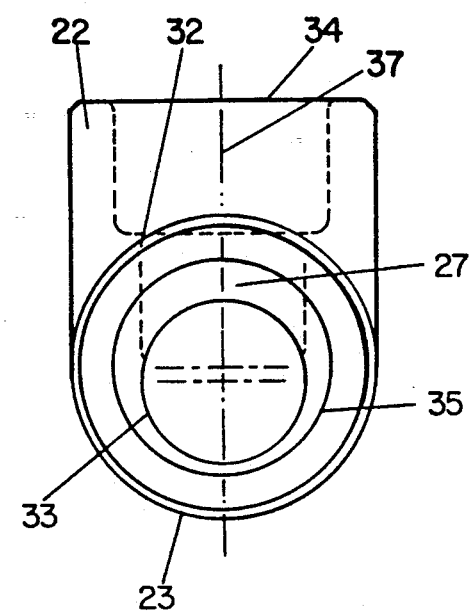
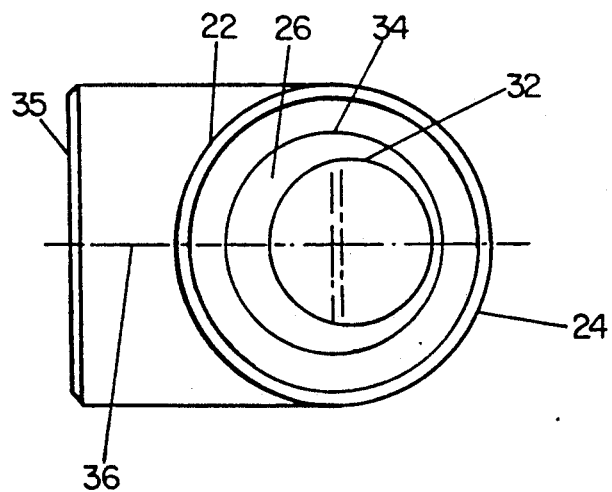
FIG. 6

TUBE CONNECTING ELEMENT OF PLASTIC FOR SANITARY AND HEATING PURPOSES

FIELD OF THE INVENTION

The invention relates to a T-configurated tube connecting element of plastic for sanitary and heating purposes, which has two connecting sleeve elements forming a common flow through bore which are in alignment with respect to one another, and into the bores of which plastic tubes may be welded. A sleeve body is provided between the two connecting sleeve elements and forms therewith a united entirety, which sleeve body is provided with a bore extending perpendicularly to the bores of the connecting sleeve elements and serves for the reception of a third plastic tube.

BACKGROUND AND SUMMARY OF THE INVENTION

Tube connecting elements of this kind manufactured of plastic, which are also called fittings, consist generally of polypropylene and if they are used in the sanitary or heating area and thus for instance for the transport of hot water, they have to comply with the regulations of admittance defined by the national authority DVGW. These regulations prescribe that at temperature of 95° C. and under pressure of 18 bar the life time should be 1000 hours, considering the fact, however, that such a kind of tube connectors are only admitted for a pressure of 8,5 bar and a temperature of 70° C.

It has now be found out that the resistance and life time of such tube connecting elements of polypropylene under operation conditions corresponding to the stated admitted values, are far below 1000 hours. Already after 100 hours the occuring tensions within the material cause deformations which can at first be realized by the fact that the material becomes discolored, which color changes extend in a circular arch like manner as diagrammatically shown in FIG. 1 of the drawings by dotted lines with the consequence that relatively quickly cracks and breaks of the material occur in the discolored areas.

Similar appearances of deformation or fatigue of material in connection with deformation or cracks are also observed in angularly formed tube connecting elements and have therefore been subject of numerous tests and basic considerations having the purpose to delete these drawbacks and to increase the resistance or life time, respectively, of such tube elements under comparably high inside pressures and inside temperatures.

The above mentiond purpose corresponds also to the main object underlying the invention, i.e. to overcome the above stated drawbacks in order to improve the quality of this kind of tube connecting elements.

In this connection it is an especial object to be solved to increase the resistance and the life time of this kind of tube connecting element if they are used under high inside pressure and high inside temperatures so that sanitary equipments and heating equipments including this kind of tube connecting elements operate more reliable and need relatively low cost for maintenance and repair.

These and other objects are solved according to the invention by the fact that the sleeve element is provided with a bore connecting the two bores of the connecting sleeve elements, which bore is with respect to the center line of the two bores provided with a center line offset in the direction to the outer wall of the T-configured tube connecting element located opposite or to the perpendicularly extending bore, which connecting bore is provided with a diameter B smaller than the diameters A1, A2 of the bores of the connecting sleeve element, and which is separated from the perpendicularly extending bore by its bottom wall having a thickness C corresponding generally to the wall thickness D1 of the connecting sleeve elements and being joined with the perpendicularly extending bore by a bore, the cross section thereof being in general smaller by the wall thickness D1 of the connecting sleeve element than the cross section of the perpendicularly extending bore.

Characterizing for this structural configuration of the tube connecting elements is not only the fact that these elements completely comply with the test conditions, i.e. the use of polypropylene as material under an operational temperature of 95° C. and an operational pressure of 18 bar over 1000 hours without such a strong deformation that the elements burst, but also the fact that those test conditions are reached withoug essential change of the weight of the connecting element and without a structural change of its configuration as well as without essential change of the throughput. This means no increase of manufacturing cost with respect to the former conditions and also no change of the connecting conditions, as plastic tubes already used can be welded into the new tube connecting elements without raising problems.

According to an advantageous embodiment of the subject invention the connecting bore between the perpendicularly extending bore and the sleeve body bore is provided with an elliptical cross section in which the greater main axis of the ellipse extends rectangularly to the parallel longitudinal axis of the connecting sleeve bores and the sleeve body bores. In this connection the smallest diameter of the connecting bore which in case of an elliptic cross section of that bore corresponds to the length of the small main axis of the ellipse and which extends parallel to the longitudinal axis of the bores, can be in general ⅔ of the diameter of the connecting sleeve bores and the diameter of that bore of the sleeve body extending perpendicularly to the connecting sleeve bores.

Moreover, it is advantageous to configure the tube connecting element such that the sleeve body bore extending eccentrically to the connecting sleeve bores and joining them is provided with a diameter corresponding to the inner diameter of the plastic tubes welded into these connecting sleeve bores so that over an essential part of the circumference of the sleeve body bore a smooth transition between the inner wall of the sleeve body bore and the inner wall of the welded in plastic tubes is provided.

It has also been found advantageous to arrange the connecting bore between the perpendicularly extending bore and the sleeve body bore eccentrically to the longitudinal axis of that bore extending perpendicularly to the connecting sleeve bores and moreover to provide the largest diameter of the connecting bore with respect to the diameter of the sleeve body bore such that the connecting bore penetrates the sleeve body bore up to the center line of the connecting sleeve bores.

Moreover, the eccentricity of the sleeve body bore with respect to the two adjacent connecting sleeve bores should advantageously in general correspond to the thickness of the connecting sleeve wall.

According to a further embodiment of the subject invention the tube connecting element is configured as an angeled element provided at the front faces with connecting sleeve elements for welding in plastic tubes and which is characterized therein that the tube arc connecting the two connecting sleeve elements is provided with a wall protrusion located opposite to its inner wall and narrowing the flow through cross section, which protrusion is limited by axial wall portions extending perpendicularly to one another forming with the inside wall portions of the connecting sleeve elements a unit, the construction being such that the protrusion in the direction to the connecting sleeve elements is defined by their bottom up to which the plastic tubes which are to be welded-in can be inserted.

The invention is also, briefly, a tube connecting element of plastic for sanitary and heating purposes in the form of an elbow having two axial bores. The elbow has an outer arc and inner walls diametrically opposed to the each other, and an inner curve on the circumferential inner surface of the outer arc and an outer curve on the circumferential outer surface of the outer arc. Two tube connecting sleeve elements are provided at the ends of the elbow, the connecting sleeve elements each having a bore into which a plastic tube may be welded. The element is characterized in that the elbow joining the two connecting sleeve elements is provided with a protuberance having bottom wall portions extending axially and perpendicularly to one another positioned on the inner wall of the elbow opposite the inner curve and which diminishes the throughflow cross section Q. The inner wall of the tube connecting sleeve elements forms a unitary element with the bottom wall portions. The construction is such that the bottom wall portions of the wall protuberance extend radially inwardly from inner surfaces of the inner wall and is an abutment for the plastic tubes which are to be welded in the connecting sleeve elements. The element is further characterized in that the two axial bores of the elbow are eccentrically arranged with respect to the center lines of the two axial bores of the tube connecting sleeve elements.

Further advantageous embodiments of the invention can be gathered from the sub claims.

BRIEF DESCRIPTION OF THE DRAWINGS

The invention will be described in more detail below in connection with embodiments shown in the drawings, in which FIG. 5 is a longitudinal sectional view of an angle-like connecting element according to the invention, FIG. 6 is a plan view of the tube connecting element of FIG. 5, and FIG. 7 is a front view of the tube connecting element of FIG. 5.

DESCRIPTION OF PREFERRED EMBODIMENTS

Figure 1:
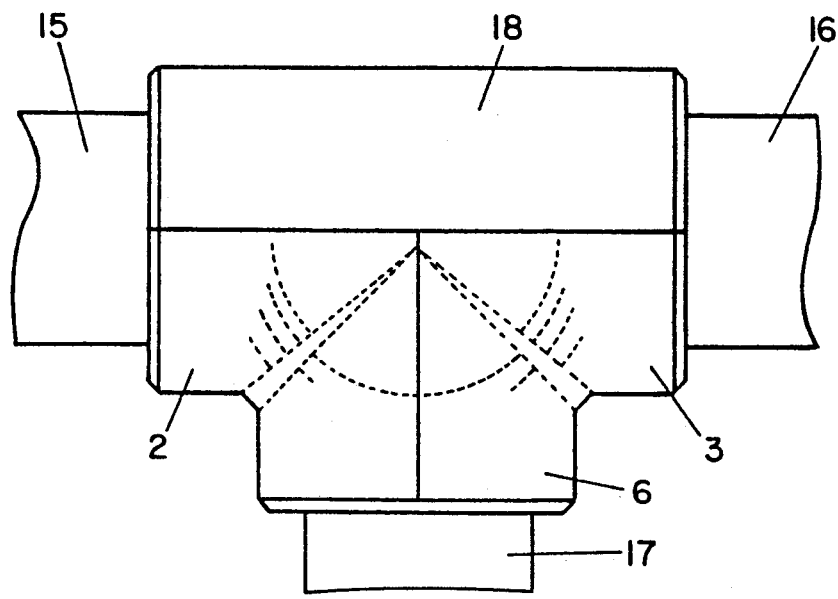
FIG. 1 is a plan view of a known T-configured tube connecting piece provided with three welded-in plastic tubes in order to show the tension lines of the material.
Figure 2:
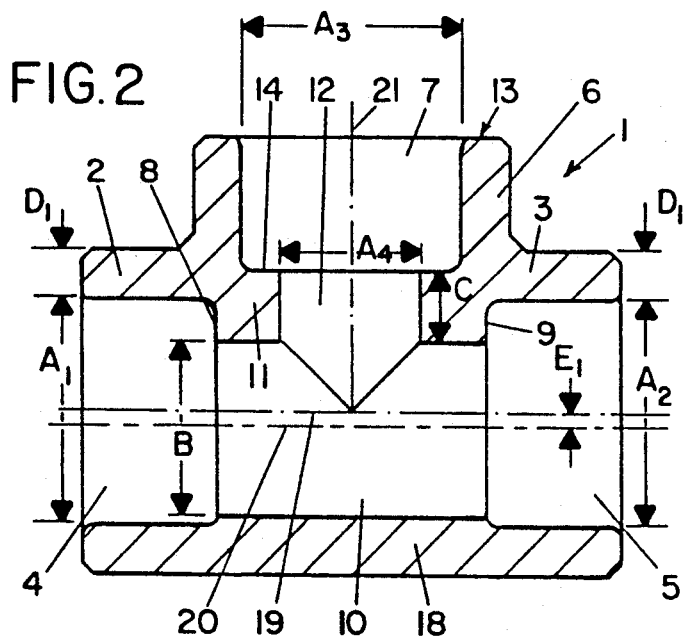
FIG. 2 is a longitudinal sectional view of the T-configured tube connecting element according to the invention.

The T-configured tube connecting element 1 of FIG. 2 consists of polypropylene and can be used for joining three plastic tubes, which are designated in FIG. 1 by 15, 16 and 17, respectively. For that purpose these tube connecting elements are provided with two connecting sleeve elements 2, 3 aligned with respect to one another and forming a common flow through bore; into the bore 4, 5 of these connecting sleeve elements the plastic tubes are welded. This T-configured tube connecting element is moreover provided with a sleeve body 6 between the two connecting sleeve elements forming with them a unitary entirety provided with a bore 7 extending perpendicularly to the bores of the connecting sleeve elements 2, 3 for the reception of the third plastic tube, corresponding to the tube 17 in FIG. 1.

The sleeve body 6 is provided with a bore 10 connecting the two bores 4, 5. This bore 10 has a center line 20 which is with respect to the center line 19 of the two bores 4, 5 offset to the outer wall 18 positioned opposite to the perpendicularly standing bore 7. That means the bore 10 of the sleeve body 6 is with respect to the two oppositely directed two bores 4, 5 eccentrically positioned by the length E. The diameter B of the sleeve body bore 10 is smaller than the diameter A1 or A2, respectively, of the bores 4, 5. The sleeve body bore 10 is separated from the perpenduclarly extending bore 7 by its bottom wall 11 having a thickness C corresponding essentially to the wall thickness D1 of the connecting sleeve elements 2, 3.

Figure 4:
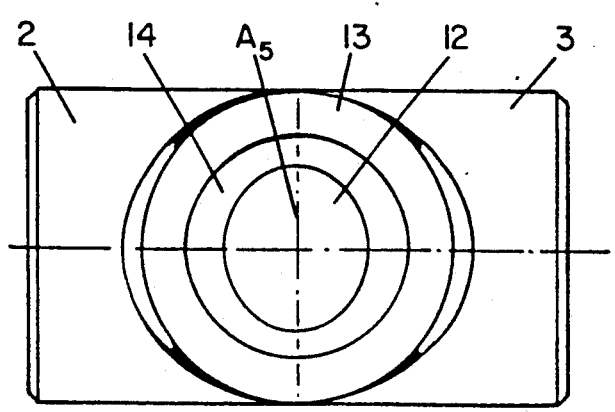
FIG. 4 is a plan view of the T-configured tube connecting element of FIG. 2.

The bore 7 is moreover connected to the sleeve body bore by an eccentric bore 12 of elliptical cross section as shown in FIG. 4. The cross section of this elliptical bore is related to the small main axis A4 of the ellipse smaller by in general the wall thickness D1 of the connecting sleeve elements 2, 3 than the cross section of the perpendicularly extending bore 7. The greater main axis A5 of the ellipse of the bore 12 extends rectangularly to the parallel longitudinal axis 19, 20 of the connecting sleeve bores 4, 5 as well as the sleeve body bore 10.

The diameters A1, A2 of the connecting sleeve element bores 4, 5 as well as the diameter A3 of the bore 7 extending perpendicularly to them are equal and correspond essentially to the outer diameter of the plastic tubes which are to be inserted into these bores and are to be welded therein.

The diameter B of the sleeve body bore 10 extending excentrically to the bores 4, 5 and connecting the same is so great that it corresponds essentially to the inner diameter of the plastic tubes which are to be welded into the bores 4, 5 so that the throughput cross section of the T-configured tube connecting element in direction of the longitudinal axis 19, 20 is not diminished by the sleeve body 6 itself.

Figure 3:
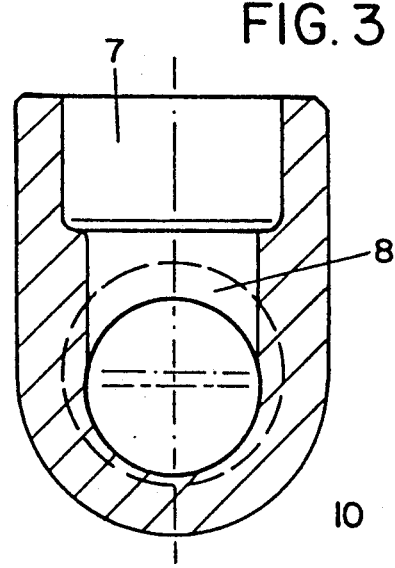
FIG. 3 is a cross sectional view of the T-configured tube connecting element of FIG. 2.

By the eccentric arrangement of the sleeve body bore 10 with respect to the bores 4, 5 connecting it at both sides thereof the tube connecting element obtains an additional stability in the area of greater tensile strength if it is operated under an inside pressure up to the admitted upper limit of 18 bar and at a water temperature of 95° C., which strength avoids a deformation too great under the above mentioned conditions and which guarantees therefore the requested stability up to 1000 hours. The additional wall material taking over the deformation forces in the area of penetration of the perpendicularly extending bore 7 and the longitudinal bores 4, 5, 10 changes the throughput cross section insignificantly only, without increasing the weight of element essentially or changing the outer dimensiones of the tube connecting element. In this connection it is essential that the perpendicularly extending bore 7 is provided at its bottom 14 forming a stop for the plastic tube 17 to be welded in with the bore 12 the cross section of which is smaller by about the twice wall thickness D1 of the connecting sleeve elements 2, 3 than the cross section of the bore 7. In the described case of an elliptic cross section of that bore the length of the small main axis A4 of the ellipse corresponds approximately ⅔ of the diameter A1 or A2 or A3, respectively. The length of the greater main axis A5 of the ellipse of the connecting bore 12 is selected such that the connecting bore 12 penetrates the last mentioned bore 10 up to the center line 19 of the bores 4, 5. Therefore, an excentricity E1 of the sleeve body bore 10 with respect to the two connecting sleeve element bores 4, 5 adjacent to it is established corresponding approximately to half of the thickness D of the connecting sleeve element wall. That means that the longitudinal axis 20 of the sleeve body bore 10 is offset by the value D2 in the direction of the outer wall 18 of the T-configured tube connecting element and is thus positioned offset from the bottom 14 of the bore 7, as can be gathered especially from FIG. 3.

Tests have revealed the fact that the thus structured T-configured tube connecting element has a crack pressure of 54,8 bar under 95° C., whereas the crack pressure of a known T-configured tube connecting element which is not provided with the features of the subject invention is at the same temperature about 34 bar.

In case the tube connecting element is not T-configured but has the configuration of an angle (elbow) element, for instance a 90°-curved element, the same measures may be adopted as shown by the FIGS. 5 through 7 on the basis of the above mentioned perception concerning the special reinforcement of the wall in that area of the element in which the deformation forces are so great under the influence of pressure and temperature that they can cause cracking of the wall. The tube connecting element 21 shown in FIG. 5 in form of a 90° angle element consists of polypropylene and is provided at its both ends with connecting sleeve elements 22, 23 having bores 34, 35, respectively, into which plastic tubes of the kind as shown in FIG. 1 by 15 and 16 are inserted and welded therein. The two connecting sleeves 22, 23 are connected to one another by a tube arc 24, which is provided with a wall protuberance 25 located inner side (wall) 39 of the outer curve of the elbow and diminishing the throughput cross section Q, which tube arc is limited by wall portions 28, 29, extending axially and perpendicularly with respect to one another. This wall protuberance forms together with the inner wall portions 30, 31 of the tube connecting sleeve elements 22, 23 a unit and is limited in direction to the connecting sleeve elements by their bottoms 26, 27 abutting to the plastic tubes which are to be welded therein.

The two axial bores 32, 33 of the tube arc 24 are eccentrically offset by the length E2 with respect to the center lines 36, 37 of the two axial bores 34, 35 of the connecting sleeve elements 22, 23. That means, the throughput bore 38 of the tube arc 24 is offset located to the outer wall of the tube arc in order to obtain material for the wall protuberance 25. This is necessary in order to take over the tensional stresses within said corner (curve) area of the angle-like (elbow) configurated tube connecting element 21 under the influence of pressure and temperature in order to stabilize the angle so that a deformation and the risk of breaking or cracking caused by such deformation is avoided. The extent of the eccentricity E2 of the axial bores 32, 34 at one hand and the axial bores 33, 35 at the other hand corresponds essentially to the half wall thickness D2 of the connecting sleeve elements 22 and 23, as can be gathered from FIGS. 6 and 7. This eccentricity E2 can thus also correspond to the wall thickness of the plastic tubes which are to be inserted into the connecting sleeve elements 22 and 23 and welded therewith so that the throughput cross section of the tube connecting element and thus the amount of throughput can not be affected at all or is only minimally affected by the protuberance 25. The additional material necessary for the protuberance 25 causes only a very small increase of the weight of the element. The dimensions of this tube connecting element remain unchanged as already pointed out with respect to the embodiment of a T-configurated tube connecting element as shown in FIGS. 1 through 4 if compared with the already known types of such elements of corresponding size.

Principally the increase of strength and therefore stability or lifetime as described above in connection with a 90° angle element can also be gained for angle elements of plastic material provided with an angle other than 90°. In each case the stability is secured by an enforcement of the wall at the inner side of the angle element as shown by a longitudinal sectional view in FIG. 5, without needing therefore either essential additional costs for manufacture and material or causing deterioration of the throughput conditions of such angle elements in comparison with those conditions of known constructional elements of the above mentioned kind.

What is claimed is:

1. Tube connecting element having a T-configuration and being formed of plastic for sanitary and heating purposes, comprising first and second connecting sleeve elements having first and second bores, respectively, which first and second bores are in alignment with respect to one another and into which first and second respective plastic tubes are to be welded, and further comprising a sleeve body between the first and second connecting sleeve elements and forming therewith a unitary element, which sleeve body is provided with a third bore extending perpendicularly in relation to the first and second bores and which is suited for the reception of a third plastic tube, characterized in that the sleeve body is provided with a fourth bore connecting the aligned first and second bores, the center line of the fourth bore being offset with respect to the center line of the aligned first and second bores in the direction of an outer wall of the tube connecting element, opposite to the perpendicularly extending third bore, which connecting fourth bore is provided with a diameter B smaller than respective diameters A1, A2 of the first and second bores, and being separated from the perpendicularly extending third bore by a bottom wall thereof, the bottom wall having a thickness C substantially equal to a wall thickness D of the first and second connecting sleeve elements and which fourth bore is joined with the perpendicularly extending third bore by a fifth bore, the cross section of which is in general smaller by the wall thickness D of the connecting sleeve element than the cross section of the perpendicularly extending third bore.

2. Tube connecting element according to claim 1, characterized in that the connecting fifth bore between the perpendicularly extending third bore and the sleeve body fourth bore is provided with an elliptical cross section in which the greater main axis of the ellipse extends perpendicularly to the parallel longitudinal axes of the connecting sleeve first and second bores and the sleeve body fourth bore.

3. Tube connecting element according to claim 1, characterized in that the diameters A1, A2 of the connecting sleeve first and second bores and the diameter A3 of the perpendicularly extending third bore of the sleeve body are identical to one another.

4. Tube connecting element according to claim 1, characterized in that the diameter of the sleeve body fourth bore is eccentrically positioned relative to the connecting sleeve first and second bores joining the same and is substantially equal to the inside diameter of the plastic tubes welded into the connecting sleeve first and second bores.

5. Tube connecting element according to claim 1, characterized in that the fifth bore has an elliptical cross section and the smallest diameter A4 of said connecting fifth bore is substantially parallel to the longitudinal axis of the connecting sleeve fourth bore and has a size corresponding generally to 170 of the diameters A1, A2 of the connecting sleeve first and second bores, and diameter A3 of the perpendicularly extending third bore.

6. Tube connecting element according to claim 5, characterized in that the greatest diameter A5 of the connecting fifth bore joining the perpendicularly extending third bore and the sleeve body is selected with respect to the diameter of the sleeve body fourth bore such that said connecting fifth bore merges into the sleeve body fourth bore up to the center line of the connecting sleeve first and second bores.

7. Tube connecting element according to claim 1, characterized in that the cross section of the connecting sleeve fourth bore is smaller by substantially the wall thickness of the first and second connecting sleeve elements than the cross section of the perpendicularly extending third bore, and is centrically arranged with respect to the longitudinal axis of said perpendicularly extending third bore.

8. Tube connecting element according to claim 1, characterized in that the eccentricity E1 of the sleeve body fourth bore with respect to the connecting sleeve first and second bores adjacent thereto is substantially equal to the thickness D1 of the wall of the connecting sleeve element.

9. The connecting element according to claim 1, characterized in that the plastic material is polypropylene.

10. Tube connecting element of plastic for sanitary and heating purposes in the form of an elbow having two axial bores, said elbow having an outer arc and inner walls diametrically opposed to the each other, and an inner curve on the circumferential inner surface of the outer arc and an outer curve on the circumferential outer surface of the outer arc, and being provided with two tube connecting sleeve elements at the ends of the elbow, the connecting sleeve elements each having a bore into which a plastic tube may be welded, characterized in that the elbow joining the two connecting sleeve elements is provided with a protuberance having bottom wall portions extending axially and perpendicularly to one another positioned on the inner wall of the elbow opposite the inner curve, and which diminishes the throughflow cross section Q, the inner wall of the tube connecting sleeve elements forming a unitary element with the bottom wall portions, the construction being such that the bottom wall portions of the wall protuberance extend radially inwardly from inner surfaces of the inner wall and is an abutment for the plastic tubes which are to be welded in the connecting sleeve elements, and further characterized in that the two axial bores of the elbow are eccentrically arranged with respect to the center lines of the two axial bores of the tube connecting sleeve elements.

11. Tube connecting element according to claim 10, characterized in that the eccentricity E2 of the axial bores of each of the connecting sleeve elements of the elbow tube connecting element is substantially equal to the thickness D2 of its wall.

12. Tube connecting element according to claim 10, characterized in that the eccentricity E2 of the axial bores of each of the sleeve elements of the elbow connecting element is substantially equal to the wall thickness of plastic tubes which are to be welded into the tube connecting sleeves.

13. Tube connecting element according to claim 10, characterized in that the plastic material is polypropylene.

14. Tube connecting element according to claim 10, characterized in that this element is configured to be a piece bent by an angle of 90°.

* * * * *

UNITED STATES PATENT AND TRADEMARK OFFICE
CERTIFICATE OF CORRECTION

PATENT NO. : 5,316,349
DATED : May 31, 1994
INVENTOR(S) : Karl Rafeld It is certified that error appears in the above-identified patent and that said Letters Patent is hereby corrected as shown below:

In the Claims:

Column 7, line 26, delete "170" and insert --2/3--.

Signed and Sealed this

Eighteenth Day of October, 1994

Attest:

BRUCE LEHMAN

*Attesting Officer*           *Commissioner of Patents and Trademarks*